E. Ware.
Car Spring.
№ 9,107.    Patented Jul. 6, 1852.
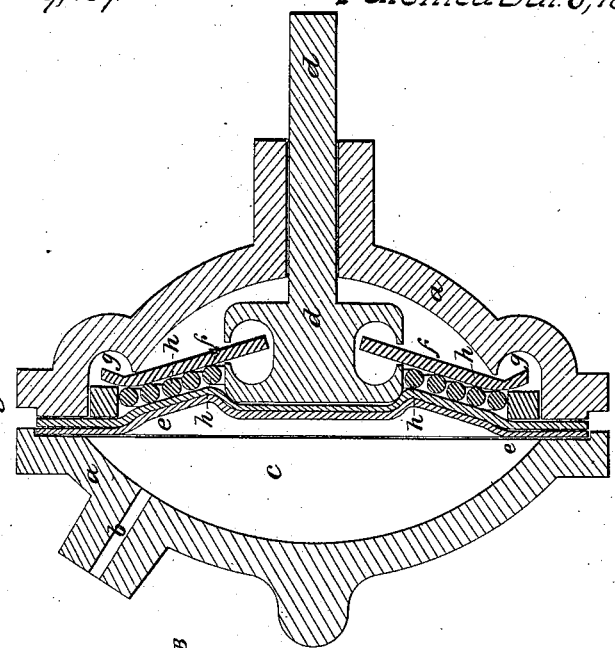
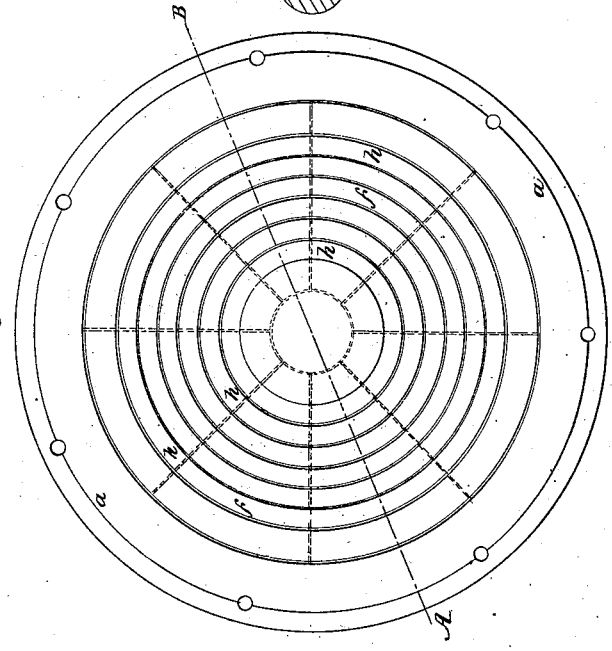

UNITED STATES PATENT OFFICE.

ELIJAH WARE, OF ROXBURY, MASSACHUSETTS.

PNEUMATIC SPRING.

Specification of Letters Patent No. 9,107, dated July 6, 1852.

*To all whom it may concern:*

Be it known that I, ELIJAH WARE, of Roxbury, in the county of Norfolk and State of Massachusetts, have invented certain new and useful Improvements in Car or other Similar Springs, and that the following description, taken in connection with the accompanying drawings, hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements.

Figure 1 is a plan or top view of the inner part of the cylinder, &c., and Fig. 2 is a vertical section of the same, taken in the plane of the line A B, Fig. 1.

This kind of car springs as they have heretofore been constructed, consisted of a cylinder with a piston fitting very accurately in the same, forcing against compressed air. The objection to this mode of construction has been that in order to have the spring air tight it was necessary to make the piston play very tightly in the cylinder, which occasioned so much friction as to cause them soon to wear and leak badly. In my improved car spring these objections are obviated as the piston instead of wearing on the sides of the cylinder, has fitted into it a movable diaphragm which presses against a disk of rubber or some other similar substance which forces against the air in a chamber beyond this diaphragm having concentric rings placed on to prevent the rubber from being worn. In air springs where this elastic disk has been used the piston head acted directly upon the rubber which was soon forced through thereby.

$a\ a\ a\ a$ in the drawings represents the outer casing or cylinder with an aperture $b$ through which the air is pumped into the chamber $c\ c$.

$d\ d$ is the piston which instead of pressing directly upon the rubber disk $e\ e$, has fitted loosely in it, the sector shaped pieces $f\ f$, &c., which bear loosely at the other end in the groove $g\ g$, forming a movable diaphragm which plays up and down with piston. This diaphragm does not bear directly against the rubber $e\ e$, but has placed on it a series of concentric rings $h$, $h$, &c., which play loosely on the sectors $f$, $f$, so that the rubber will not be worn by rubbing against the sectors or by pressing between them as would otherwise happen if these rings were not used.

It will be seen by the above description that the piston will press, without much friction evenly and alike upon all parts of the rubber, which is thus prevented from being forced through by the piston head as was formerly liable to happen, the concentric rings serving to prevent the rubber from being worn by the pieces $f$, $f$.

Having thus described my improvements I shall state my claim as follows:—

What I claim as my invention and desire to have secured to me by Letters Patent is—

An air car spring in which the piston operates upon the disk of rubber or other elastic substance which forms one side of the air chamber, is the combination of the movable diaphragm, constructed of the pieces $f$, $f$, &c., operating substantially as herein above described with the rings $h$ placed loosely on the same for the purpose herein above set forth.

ELIJAH WARE.

Witnesses:
EZRA LINCOLN,
JOSEPH GAVETT.